Patented July 31, 1934

1,968,179

UNITED STATES PATENT OFFICE 1,968,179

METHOD OF MANUFACTURING ACETYL ESTER COMPOUNDS

Kumazo Suganuma and Kan-Ichiro Goto, Tobe Machi, Naka-Ku, Yokohama, Japan

No Drawing. Substitute for application Serial No. 447,100, April 24, 1930. This application October 5, 1931, Serial No. 567,126. In Japan November 15, 1929

2 Claims. (Cl. 260—101)

The present invention relates to the method of manufacturing acetyl ester compounds, characterized by the fact that when hydroxy-carboxylic acid of aromatic compound or cellulose is acetylated, reaction is carried out by the direct employment of alkali acetate and sulfuryl chloride. The object thereof is to form acetyl oxide in solvent without using unstable acetyl chloride or expensive anhydrous acetic acid as in the known method and in nascent state to effect the acetylation and thus to manufacture acetyl ester compound in a simple and economical way, this application being substituted in place of our prior application Serial No. 447,100.

In order to acetylate hydroxy-carboxylic acid of aromatic compound or cellulose according to this invention, employ anhydrous alkali acetate as the source of supply of acetyl radicle, benzol or glacial acetic acid as solvent, and sulfuryl chloride as dehydrating agent.

The following is the manner of manufacturing acetyl ester compounds according to the present invention:—

When it is desired to manufacture acetyl cellulose, fill an acid proof reaction tank equipped with a stirrer and a cooler, with 800 volumes of the above-mentioned solvent, viz, acetic acid and put therein 500 volumes of fine powder of anhydrous sodium acetate, after which 200 volumes of sulfuryl chloride is poured thereinto and the stirrer is operated. Next, put in 100 volumes of cotton fibre. At this time, the temperature will rise due to the heat of the combination and therefore it is necessary to regulate the temperature of the solution to 40 to 30° C. by cooling the tank. Then, decomposition and substitution will occur among the constituents and the reaction will be completed in ten to fifteen hours.

Keep the solution still for a while, and sodium sulphate and sodium chloride will be deposited. Separate them from the solid matters by a filter and pour the mother liquor into a tank containing a big quantity of cold water. Then, acetylated cellulose will come up to the surface as white precipitate. Separate it, wash it with water and then dry it.

The acetic acid solution diluted with the above cold water is neutralized by sodium carbonate and is collected and utilized in the form of anhydride as the source of supply of the first acetyl radicle.

We claim:

1. Method of manufacturing acetyl ester compounds, which consists in causing sulfuryl chloride and anhydrous sodium acetate to act upon cellulose in the presence of solvent in acetylating the cellulose.

2. Method of manufacturing acetyl compounds, which consists in mixing glacial acetic acid with anhydrous sodium acetate and sulfuryl chloride, adding thereto cellulose and then acetylating the cellulose.

KUMAZO SUGANUMA.
KAN-ICHIRO GOTO.